United States Patent
McRae

(10) Patent No.: US 7,525,973 B1
(45) Date of Patent: Apr. 28, 2009

(54) FLEXIBLE SOFTWARE-BASED PACKET SWITCHING PATH

(75) Inventor: Andrew McRae, Berowra (AU)

(73) Assignee: Cisco Technology, Inc., San Jose, CA (US)

( * ) Notice: Subject to any disclaimer, the term of this patent is extended or adjusted under 35 U.S.C. 154(b) by 1491 days.

(21) Appl. No.: 10/359,344

(22) Filed: Feb. 4, 2003

(51) Int. Cl.
*H04L 12/56* (2006.01)

(52) U.S. Cl. .................. 370/396; 370/254; 709/220

(58) Field of Classification Search .......... 370/254, 370/388, 389, 396, 400; 709/220, 223, 238; 718/108
See application file for complete search history.

(56) References Cited

U.S. PATENT DOCUMENTS

| | | | |
|---|---|---|---|
| 6,850,531 B1 * | 2/2005 | Rao et al. .................. 370/401 |
| 2002/0105972 A1 * | 8/2002 | Richter et al. ............... 370/474 |
| 2004/0042475 A1 * | 3/2004 | Vinnakota et al. ........... 370/412 |
| 2008/0114887 A1 * | 5/2008 | Bryers et al. ................ 709/230 |

OTHER PUBLICATIONS

Ritchie, Dennis M., "A Stream Input-Output System," AT&T Bell Laboratories Technical Journal 63, No. 8 Part 2, Oct. 1984, pp. 1897-1910; retrieved from the Internet: <URL:http://cm.bell-labs.com/cm/cs/who/dmr/st.pdf>.

Sun Microsystems, "White Paper ID 26926: Porting SunOS 4.x Networking Device Drivers to SunOS 5.0," originally published Aug. 1991; retrieved from the Internet: <URL:http://sunsolve.sun.com/pub-cgi/retrieve.pl?doc=fwpaper/26926>.

* cited by examiner

*Primary Examiner*—Wing F Chan
*Assistant Examiner*—Matthew Campbell
(74) *Attorney, Agent, or Firm*—Charles E. Krueger

(57) ABSTRACT

A software-implemented switching path includes separate control and data planes with the data plane having a graph of feature nodes with each node implementing a feature to be applied to a packet being switched. Each feature node includes private data and code which are utilized to apply the feature to the packet. The packet is switched to a next node based on packet-specific context data.

20 Claims, 8 Drawing Sheets

FLEXIBLE SOFTWARE-BASED PACKET SWITCHING PATH

BACKGROUND OF THE INVENTION

A number of new technology initiatives, both in hardware and software, are being planned to enhance routing architectures, such as: 1) The introduction of multi-CPU processors; 2) The growing use of dedicated switching engines; 3) The longer term migration to a software foundation that lends itself to higher availability and a more structured software environment.

Current software switching paths have many drawbacks that prevent the utilization of these new technology initiatives. The switching path is tightly integrated inside the operating system (OS) and uses data structures and subroutine calls to implement features, thus making it difficult to abstract out the control plane. Also, new features (such as security or QoS features) have to be explicitly integrated into the feature path, causing performance or integration issues. Operating in a distributed system (e.g., systems where switch processing is performed on the line card instead of by the route processor) requires considerable additional work, such as writing IPC stubs. Further, this tightly integrated code is not suitable for running in a tightly coupled symmetric multi-processor system (SMP).

Additionally, current packet processing paths utilize run time checks for testing whether certain features should be applied to packets. This has several downsides such as performance issues, difficulty of integrating new features, and lack of modularity.

As result of the above considerations, it is clear that an improved software switching path is required to be able to take advantage of the new technology initiatives.

BRIEF SUMMARY OF THE INVENTION

In one embodiment of the invention, a switching architecture abstracts the data plane from the control plane, includes an API abstraction to the switching engines, and make good use of new CPUs that implement SMP. The architecture is consistent and provides pipeline of features so that the same feature code can be reused in different paths and in either central or distributed routing platforms.

In another embodiment of the invention, a software based graph of feature nodes is created that can be connected together to represent how packets are processed. The graph is built according to a router's configuration. Each node in the graph contains private data that the node can use as feature specific configuration data.

In another embodiment of the invention, packets are processed by a packet context moving through the graph. Each node may have multiple nodes connected to it for situations where a different packet path is desired. For example, a decoded MAC field of a packet may indicate different protocols where each protocol can take a different path.

In another embodiment each node contains private configuration data, so that many packet paths are possible, each representing a different interface or possible path through the router. The connections between each node are feature independent, so that new features can be simply inserted in the graph at any point. This also allows utility nodes to be inserted e.g. for debugging, packet tracing, scheduling across multiple CPUs etc.

Other features and advantages will be apparent in view of the following detailed description and preferred embodiments.

DETAILED DESCRIPTION OF THE INVENTION

The invention will now be described with reference to various embodiments implemented in a routing platform. In the following, the term routing platform is utilized broadly to include any component such a router, bridge, switch, layer 2 or layer 3 switch, gateway, etc., that refers to components utilized to implement connectivity in a network.

Generally a routing platform includes a chassis, which contains basic components such as a power supply, fans, slots, ports and modules that slide into the slots. The modules inserted into the slots are line cards which are the actual printed circuit boards that handle packet ingress and egress. Line cards provide one or more interfaces over which traffic flows. Thus, depending on the number of slots and interfaces, a router can be configured to work with a variety of networking protocols.

The basic function of a routing platform is routing, or forwarding, which consists of the operation of transferring a packet from an input interface to an output interface. The routing, or forwarding, function comprises two interrelated processes to move information in the network, i.e., making a routing decision by routing and moving packets to the next-hop destination by switching. Many routing platforms perform both routing and switching, and there are several types of each.

Routing

The routing process assesses the source and destination of traffic based on knowledge of network conditions. Routing functions identify the best path to use for moving the traffic to the destination out one or more of the router interfaces. The routing decision is based upon a variety of criteria such as link speed, topological distance, and protocol. Each separate protocol maintains its own routing information.

Switching

Through the switching process, the router determines the next hop toward the destination address. Switching moves traffic from an input interface to one or more output interfaces. Switching is optimized and has lower latency than routing because it can move packets, frames, or cells from buffer to buffer with simpler determination of the source and destination of the traffic. It saves resources because it does not involve extra lookups.

In the switching process packets are received, for example, on a Fast Ethernet interface and destined for an FDDI interface. Based on information in the packet header and destination information stored in the routing table, the router determines the destination interface. It looks in the protocol's routing table to discover the destination interface that services the destination address of the packet.

Figure 5:
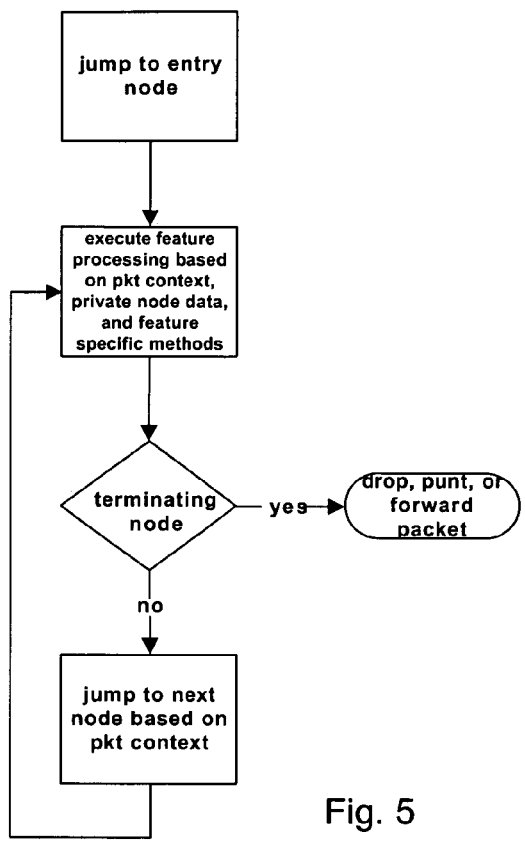
FIG. 5 is flow chart depicting the processing of a packet in an embodiment of the invention.

The destination address is stored in tables such as ARP tables for IP and AARP table for AppleTalk. If there is no entry for the destination, the router will either drop the packet (and inform the user if the protocol provides that feature), or it must discover the destination address by some other address resolution process, such as through the ARP protocol. Layer 3 IP addressing information is mapped to the Layer 2 MAC address for the next hop. FIG. 5 illustrates the mapping that occurs to determine the next hop.

Distributed Switching

Switching becomes more efficient the closer to the interface the function occurs. In distributed switching, the switching process occurs on a versatile interface processor (VIP) and other interface cards that support switching.

Cisco Express Forwarding (CEF)

By using CEF, designed and manufactured by the assignee of the present patent application, each of the line cards maintains a Forwarding Information Base (FIB) table downloaded from the switch processor. Any changes made to the route processor routing table, caused by additions or deletions of routes or route flaps, are updated in the central FIB, which in turn updates the line card FIBs. This means that, at all times, all line cards have a correct map of the network topology.

Features

CEF provides many features including load sharing, recursive route resolution, and access lists. CEF uses two tables maintained in the route processor and downloaded to the line cards: the FIB and adjacency table. The FIB table is used for making forwarding decisions. The adjacency table maintains the adjacent nodes, and the link-layer information (such as packet rewrite information) necessary to reach that adjacent node.

These and other features are implemented by the switching path. For example, security or policing features include access control lists (ACLs) which restricts certain traffic from gaining access to a network and Quality of Service (QoS) features include Weighted Random Early Detection (WRED) to prevent harmful effects of interface congestion on network throughput and the Committed Access Rate The Committed Access Rate (CAR) feature which manages bandwidth by limiting the input or output transmission rate on an interface or subinterface based on a flexible set of criteria.

As described above, in existing system interfaces are configured using the OS and the software for switching and implementing features is tightly coupled to the operating system. An embodiment of the invention will now be described by way of example, not limitation, in the context of the internetworking operating system (IOS®) manufactured and distributed by the assignee of the present patent application. This embodiment includes control plane/data plane separation and utilizes a flexible building block approach that pipelines the software switching path to facilitate SMP, code reusability, testing, and central or distributed operation.

Figure 1:
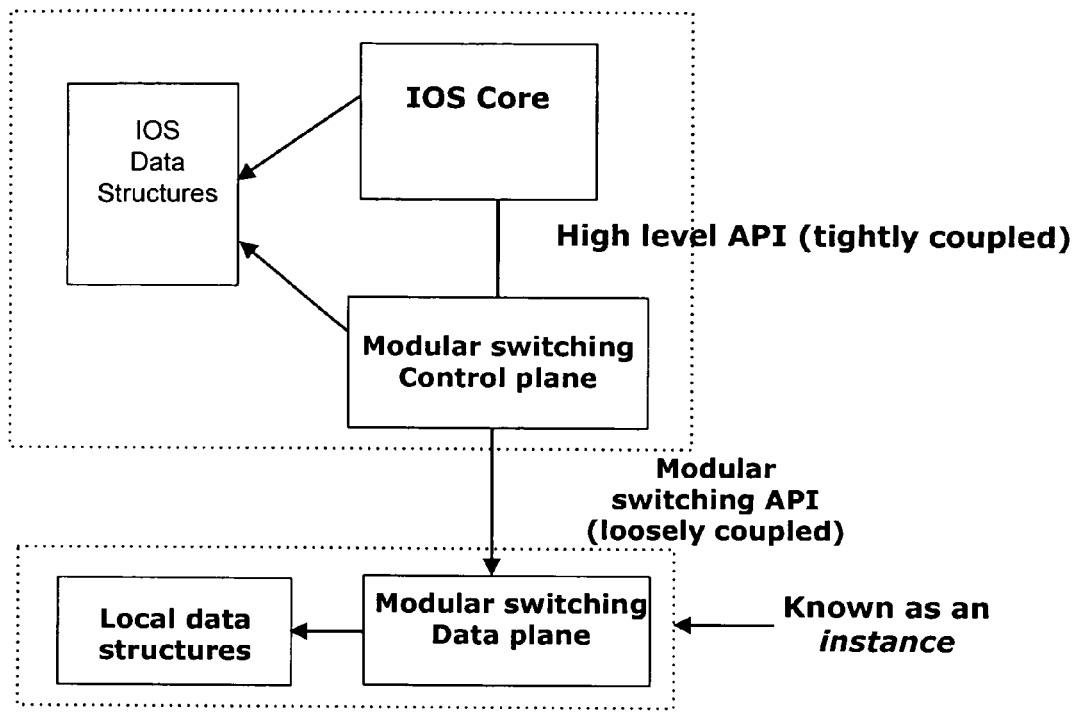
FIG. 1 is a block diagram depicting the separation of the control and data planes in a preferred embodiment.

FIG. 1 is a high-level block diagram of an embodiment of the invention which depicts the separation of the data and control planes 2 and 4. Network architectures have been partitioned into planes to handle the complexity of networking processing. The data plane 4 in this embodiment performs the functions of pulling packets into and pushing packets out of the routing platform as fast as possible. Switching, security features, and QoS features are applied in this plane. The control plane 2 manages the routing of the traffic that the control plane is moving, allocates resources, and sets up and tears down connections.

Figure 2:
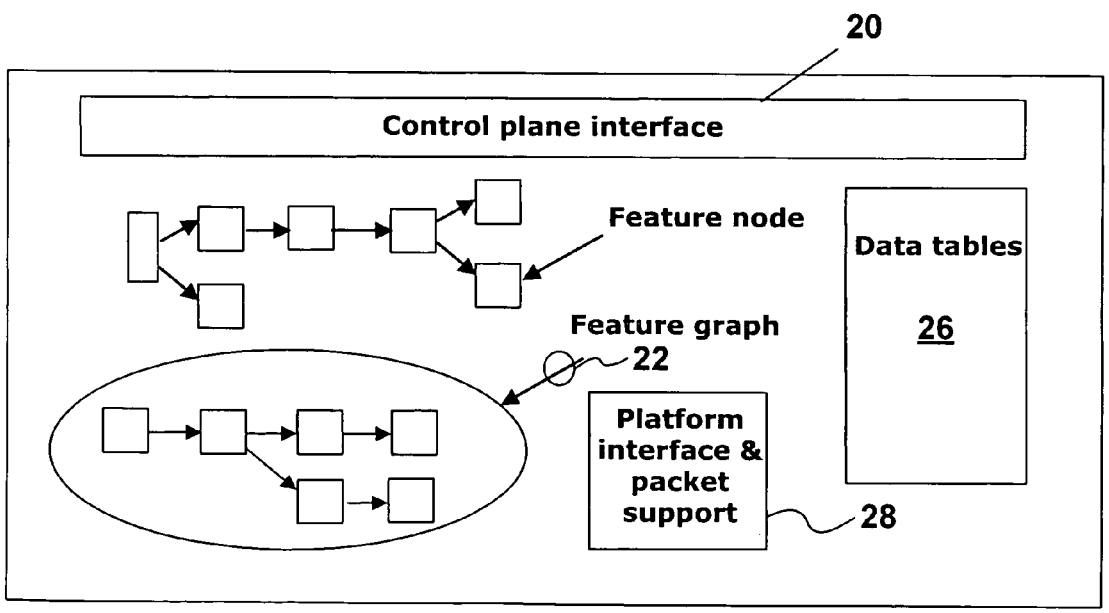
FIG. 2 is block diagram of the data plane.
Figure 3:
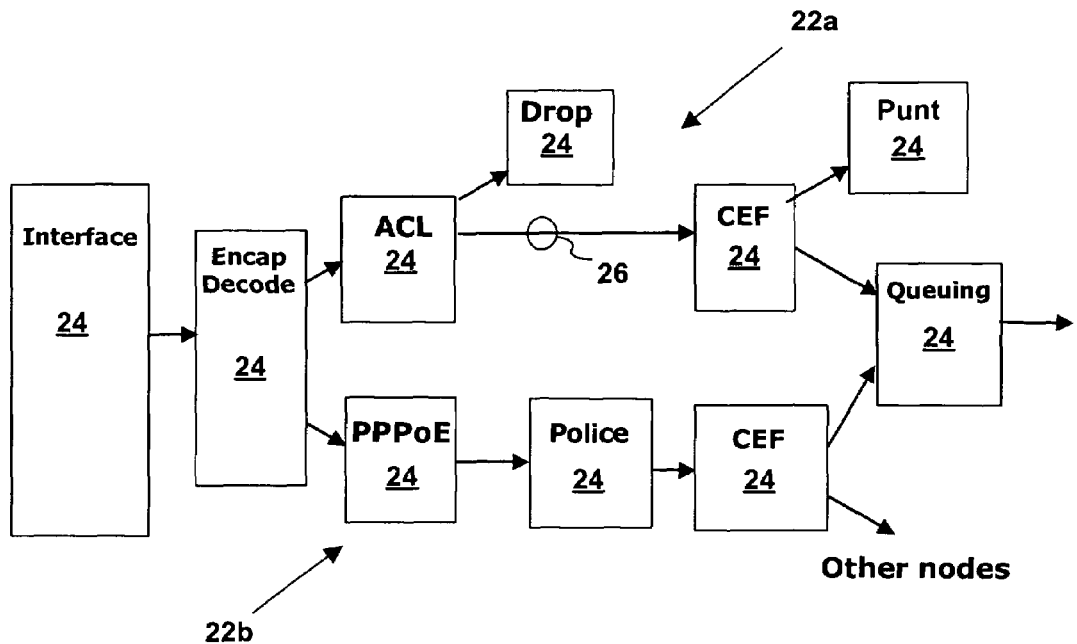
FIG. 3 is a block diagram depicting an example of modular switching paths.
Figure 4:
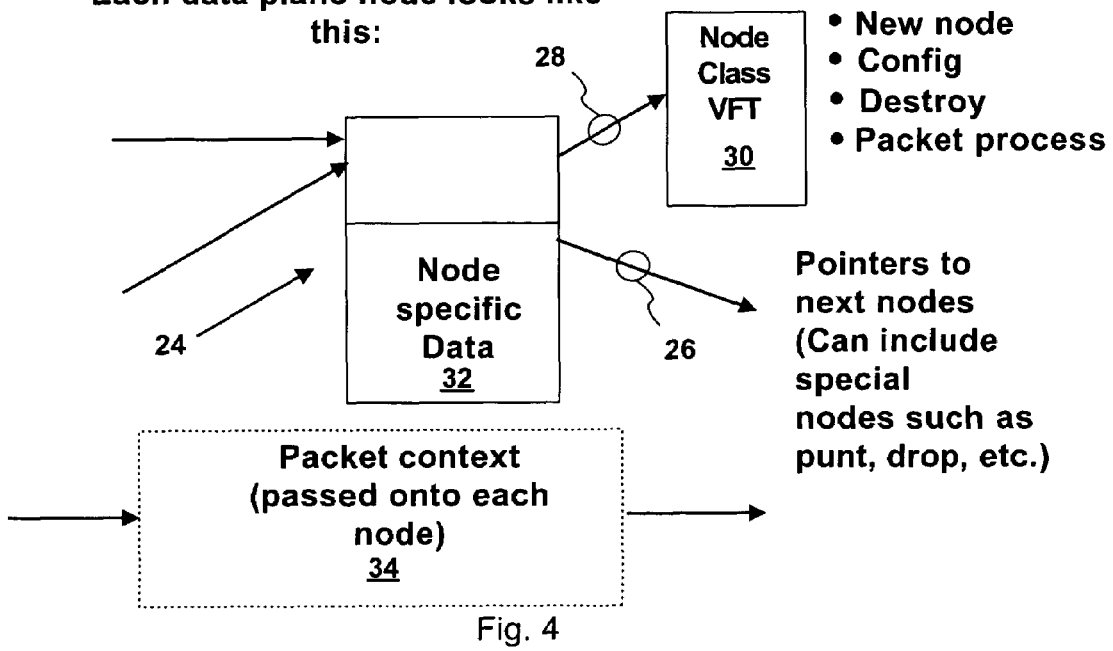
FIG. 4 is a block diagram of a modular switching (MSW) node.

An overview of an embodiment of the invention will now be provided with reference to FIG. 2 which is a diagram depicting a data plane instance, FIG. 3 which is a block diagram depicting a modular switching path and FIG. 4 which is a diagram depicting the structure of a node.

Referring first to FIG. 2, the instance of the data plane 4 includes a control plane interface 20, at least one feature graph 22, comprised of nodes, also called plugs, 24, local data tables 26, and a platform interface and packet support block 28.

In this embodiment, as depicted in FIG. 3, the modular switching (MSW) code includes first and second directed graphs 22a and b configured on interconnected nodes 24. As depicted in FIG. 4, each node 24 contains pointers 26 to other nodes, a VFT pointer 28 to a Virtual Function Table 30 containing the code methods for the particular feature implemented by the node, and an optional amount of node specific configuration data 32. Also depicted in FIG. 4 is a packet context 34 which is passed to each node as it processes a packet.

These nodes 24 can be used as building blocks in creating a graph of feature processing nodes 24 for a particular set of features representing the configuration of an interface. Each node 24 can contain specific configuration data, thereby eliminating the need for the feature code to reference configuration data in a separate data structure. The cost of each node is low so that there can be a large number of nodes. The nodes themselves consist of a base object which is then extended by each feature code to contain the relevant configuration for that feature.

Each node has a VFT pointer 28 pointing to a feature (VFT) that defines a set of standard functions (methods) as an API for the node. There can be many nodes that all point to the same VFT, representing many instances of a single feature in different packet pipelines.

The switching path is considered a graph rather than a pipeline because potentially a feature could be involved in the packet path in multiple places, especially when packet tunnel (de)encapsulation is taking place. The switching graph constructed as a number of interconnected nodes replaces a single software path that uses runtime branching to select the appropriate features to apply to packets.

Implicit in the processing of the packet by each node is the packet context 34, containing relevant information about the packet. In this embodiment the packet context includes a pointer to the location in memory where the packet is stored, the size of the packet, the identity of the input interface, and optionally, protocol specific fields such as, for IPv4, a pointer to the IP header, a classification index, and flags. The packet context may be used in conjunction with the configuration data contained within the node to make decisions, such as selection of the next node, concerning the processing of the packet.

A node may also be pointed to by multiple nodes, and a node may also have multiple nodes that it points to using the packet data or context to select the appropriate next node.

The basic processing of a packet through a feature graph will now be described. In routing platforms, a particular packet is received at an input interface and stored in a buffer.

The encapsulation is then decoded and the destination interface of the packet is then determined either by a central route processor or by an ASIC residing on a line card. The switching fabric then is used to transfer the packet to an output interface. Security and QoS features may be applied either at the input or output queues.

The processing of a packet by the nodes in the feature graph will now be described with reference to flow chart depicted FIG. 5 and the feature graph example of FIG. 3. When the packet is received at the input interface it must be inserted into the feature graph pipeline. In one embodiment, the driver for the input interface utilizes a root node pointer that points to the first node in the interface, in this example the encapsulation/decoding node.

In this example, depending on the results of the decode, the packet processing will be continued along either the first path 22a starting with the ACL (access control list) node or the second path 22b starting with the PPPoE (point to point protocol over Ethernet) node. Processing along either path reaches a CEF (Cisco Express Forwarding Module) which, as described above, does a table look up based on the packet's destination address to accesses the identity of the output interface and the MAC address from the adjacency table.

In this embodiment, the selection of the next node can be implemented as part of the CEF tables. For example, in the CEF adjacency table a pointer to the next node can be included in addition to the output interface and MAC. Thus, in the example, the CEF node of the first path has only one hard-coded node, i.e., the Fallback node. This is an example of how the next node in a chain may be obtained in a variety of ways, such as within the data portion of the node itself or in external tables that the node functions can reference.

Thus, not shown in FIG. 3, are the many potential paths out of the CEF nodes. These paths are represented in the first path by the Queuing node. The paths terminating at the CEF node form the configuration of the input interface and features implemented after CEF node form the configuration of the output interface.

The termination node in this example of FIG. 3 is either a Fallback node or a Queuing node. Fallback nodes will be described more fully below. Assuming the packet terminates at the Queuing node the output interface driver will remove the packet from memory and transmit it on the network media.

As a packet is processed through the graph, it progresses by traversing the appropriate nodes and having that node's feature processing applied to it. Certain nodes may select different paths for the packet so that the path becomes context dependant on the packet, avoiding unconfigured features, e.g. if an input interface does not have any ACLs configured on it, no ACL feature node will exist in that packet path.

Ultimately, as described above, the packet will arrive at some terminating node, such as an output interface, or a drop or Fallback node, where the packet processing completes. Drop and fallback adjacencies are used to expedite switching when certain exception conditions exist. A Fallback causes packets to be forwarded to the next switching layer for handling when features that require special handling or features that are not yet supported in conjunction with CEF switching paths are processed. A drop causes a packet to be dropped.

Nodes can also decide to forward a packet to the control plane for special processing, such as when some control operation needs to take place, or some information is required before the packet can be further processed. This is called a 'punt' to the control plane. The control plane is provided with the identification of the node from where the packet has been forwarded (as well as an indication of the cause of the punt), and a control plane method specific to that type of node is invoked.

The control plane, upon receiving this packet, can perform the appropriate operations required and can then decide to either drop the packet, send it to a fallback path, or reinsert the packet back into the modular switching data plane. The node at which it is reinserted is normally the node from which it came, under the assumption that the interrupted processing can be repeated, but the control plane can forward it to any other node that is appropriate. As an example, if the CEF forwarding node identified the next hop for the packet as being via an Ethernet network, but the media layer address is not known, the CEF node can punt the packet to the control plane, and the control plane CEF processing will cause the appropriate ARP actions to be take place, and once the media address information is known, the delayed packet can be reinserted into the data plane for forwarding.

Control Plane Interface

As described above, one of the structural problems with existing switching paths is that the switching code is tightly integrated with OS data structures making it difficult to abstract out the control plane. In modular switching path depicted in FIG. 3, each node includes configuration data eliminating the need to reference data structures in the OS. There are significant advantages to distilling out the data plane from the control plane, some immediate and others that are longer term, such as the ability to reuse the data plane (switching module) in future OS replacement systems. One of the more significant advantages is that the switching engine can be upgraded or replaced without significant impact to the control plane.

Generally, the control plane software is responsible for setting up tables for the data plane, communicating information between neighboring devices, keep alives, and other signaling and routing protocols.

The data plane which, in this embodiment is implemented as the directed graph of nodes described above and depicted in FIG. 3, is responsible for switching functions including switching of packets, security, and quality of service.

FIG. 1 is a block diagram depicting the layering of the OS and modular switching control planes and their interfaces.

Figure 6:
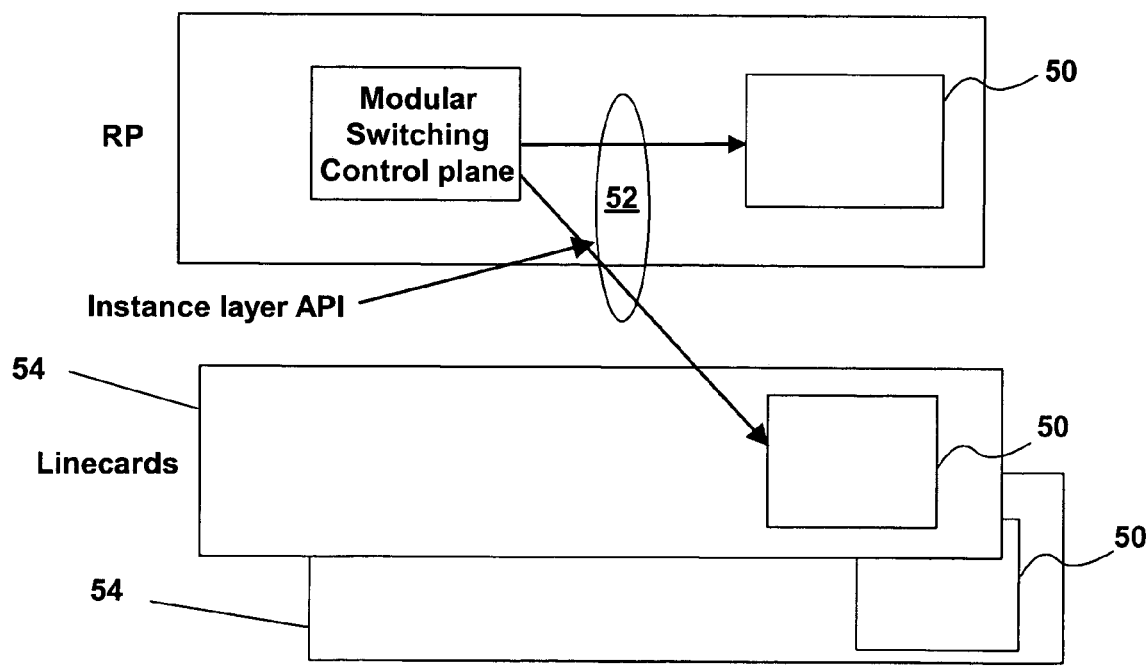
FIG. 6 is a block diagram depicting multiple instances implemented on different linecards.

FIG. 6 depicts how a single control plane may be required to manage multiple line cards or switching engines; to facilitate this, each separate entity that runs MSW is known as an MSW instance 50. In this embodiment, each instance 50 incorporates a separate packet switching domain. The natural boundaries of these domains implies that:

Nodes cannot be connected across domains. To deal with architectural issues such as inter-linecard packet handling, it is possible that nodes representing domain boundaries can be implemented that act as bridges between domains.

Node identification and management is specific to each instance. Within a complete system, nodes may be globally identified only together by the node ID and the instance it belongs to.

Nodes only have local scope within its own domain i.e. a node cannot access nodes in other domains.

Different instances may have a different platform specific method of interconnection with the control plane, e.g., within a distributed system, one domain may exist as a local instance as part of the control plane system, and another domain may exist on a linecard accessed via backplane IPC.

Instances may be viewed as separately loadable subsystems.

When the control plane creates and manages nodes, it does so within the context of a particular instance.

MSW itself contains an instance management layer 52 designed to interface with the control plane side MSW management software. This instance management layer 52 acts as a proxy for the control plane, both for common code and for feature specific support. For example, this code would provide memory management for MSW nodes (allocation/deletion of nodes), mapping of node IDs to the actual nodes, etc.

For example, in a system as depicted in FIG. 6 which utilizes distributed switching, such as CEF described above, an instance of MSW would be present on each linecard 54. In this case, packets could be sourced or sinked either by the network interfaces, located on the linecard and connected to network media, or to the backplane. If, after a CEF table lookup, it is determined that a packet is to be sinked on an interface of another line card, having another instance of MSW implemented thereon, a half node on the instance of the first line card, utilizing the platform interface and packet support block 28 (FIG. 2) on that linecard, would sink the packet onto the backplane and a half node on the instance of the second linecard, utilizing the platform interface and packet support block 28 (FIG. 2) on the second linecard, would source the packet.

Figure 7:
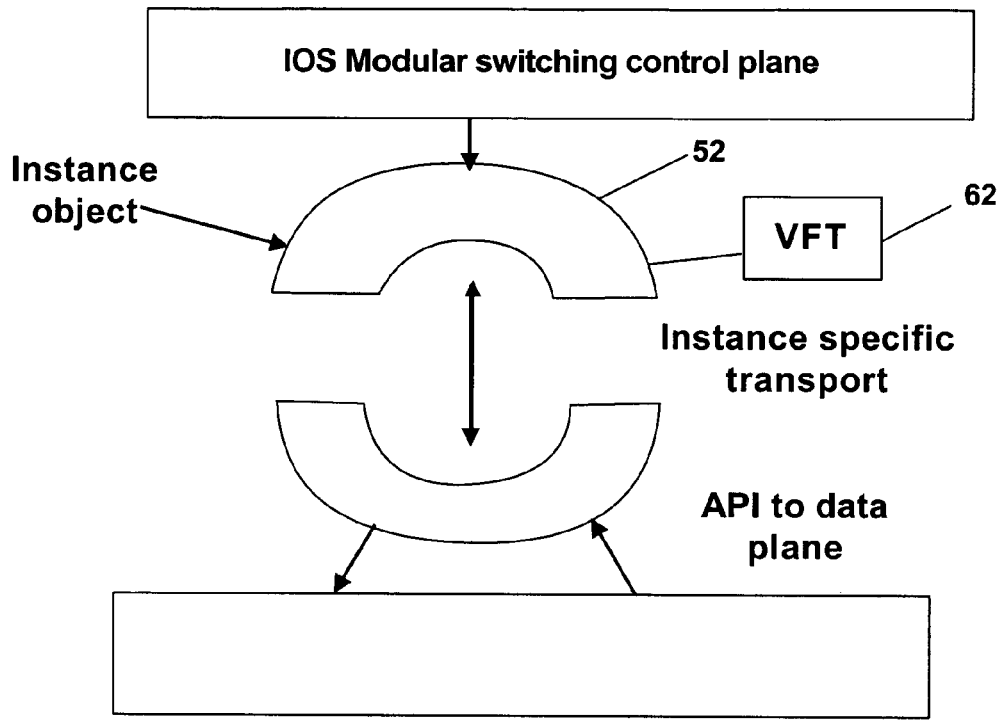
FIG. 7 is a block diagram depicting the instance interface to the control plane.
Figure 8:
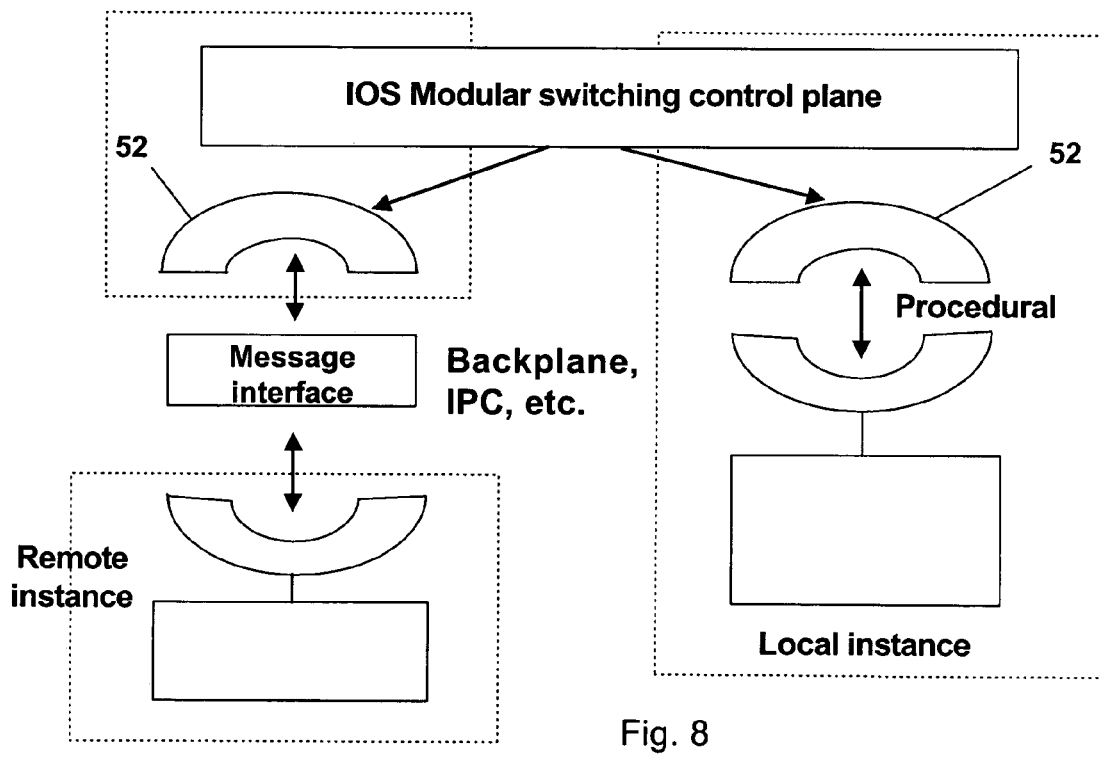
FIG. 8 is a block diagram depicting the instance interface for a remote and local instance.

As depicted in FIG. 7, the control plane interface between the IOS® operating system (or any other OS) uses an OS and platform dependant instance management layer 52 to isolate the details of the actual communication method between the control plane and MSW feature graph. As depicted in FIG. 8 on a local instance, this communication method may simply utilize function calls. On a remote instance, in a distributed system, the communication method may utilize an IPC messaging layer.

This MSW instance management layer 52 is designed to interface with the control plane side MSW management software. This layer 52 acts as a proxy for the control plane, both for common code and for feature specific support. For example, this code would provide memory management for MSW nodes (allocation/deletion of nodes), mapping of node IDs to the actual nodes, etc.

The instance contains the access methods for the nodes on that domain, so that when the control plane creates and manages nodes the calls are vectored through an instance VFT 62 that will provide the appropriate interface for accessing that domain, e.g., function calls to a local instance, message marshalling and IPC to a linecard, etc. The instance also contains the method for allocating node identifiers, since each instance has a separate set of node identifiers.

Node Management

In this embodiment, the level of management within the MSW module itself is very minimal, and a control plane management module exists that performs the bulk of the management of the nodes such as deciding the graph layout according to the router configuration, creation and deletion of nodes, etc.

The nodes comprising the feature graph are determined by the configuration of the interface. In the IOS® operating system interfaces can be configured by the network administrator.

Figure 9:
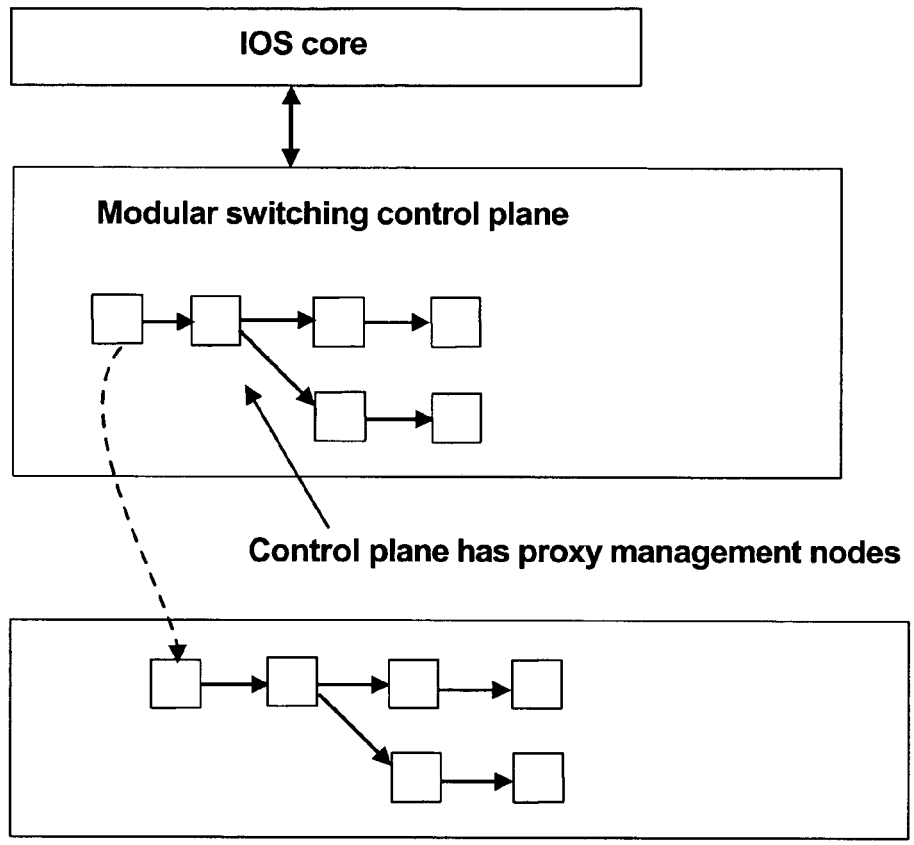
FIG. 9 is a block diagram depicting proxy management nodes and corresponding data plane nodes.
Figure 10:
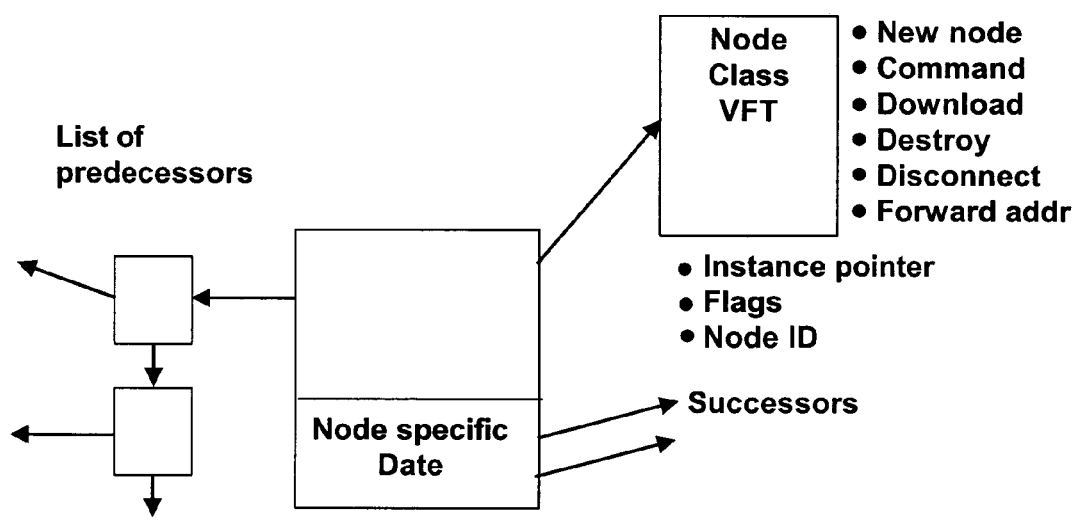
FIG. 10 is a block diagram of a proxy management node.

Nodes within an MSW instance are identified with a simple integer node ID. The control plane side management allocates these values, and when requesting creation of nodes within MSW, provides the node ID so that MSW can bind this node to this ID. The control plane manager keeps track of node usage so that nodes can be destroyed when no longer in use. As depicted in FIG. 9, the control plane manager keeps a proxy set of management objects that represents each node within MSW itself. These proxy nodes are depicted in FIG. 10 and contain:

A pointer to the instance that this node belongs to.
The node identifier.
A set of flags describing attributes of this node.
Node graph pointers to the predecessors and successors of the node.
Node specific data that can be used within the node to configure or control the data plane portion of the node.
A pointer to a VFT containing some methods for this node.

The entries that are defined for the control plane's proxy node are:

*new—create and initialize a new instance of this node type. This should trigger a create of a node within the data plane as well.
*download—if an instance has to be reinitialized (e.g. as a result of a line card reload), this method is called to download the current configuration of this node.
*destroy—called when this node is no longer required. This method should free the node.
*forwarding_addr—when a node is removed, it provides a forwarding address of another node (usually one of the downstream nodes) so that the nodes that point to the node being removed can be informed of an alternative node to connect to.
*disconnect—A node that this node points to is being removed, so the link to that node has to be removed. An alternative node is offered as a replacement.
*command—actions being driven from the control plane such as configuration commands, node connection etc., are performed through this vector.
*putn-a packet has been punted from the data plane, and this function should decode the cause, and perform whatever control actions are required by the data plane. The control code can then drop the packet, reinsert it back into the data plane, or otherwise dispose of the packet.

A set of utility functions exist that the control plane code can call to control the linking and management of the different proxy nodes.

Node Structure

In this embodiment the base data structure of the node appears as follows:

```
struct plug {
struct plug_vft *vft;
};
struct plug_vft {
void (*jump) (struct plug *, struct packet *);
struct plug *(*new) (void);
void (*config)(struct plug *, int, int *);
void (*destroy)(struct plug *);
    char *name;
```

Each node (plug) class (or feature) defines a VFT pointing to the feature specific methods for this plug type, and also a data structure defining the feature specific data to be stored in the plug itself. For example, if an access list plug class were to be defined the VFT entries for this example would appear as follows:

```
static void acl_lookup(struct plug *, struct packet *)
static struct plug *new_acl_node(void);
static void acl_config(struct plug *, int, int *)
static struct plug_vft acl_node = {
acl_lookup,
new_acl_node,
acl_config,
``` acl_destroy,
"ACL"
};
VFT Entries

The plug VFT entries are used for plug specific functions where management code calls these vectors to create or configure each node, and packet path code to pass a packet to the node. The following entries are defined:

jump Used to pass control from one node to another. This function is called as: void xxx_jump (struct plug *p, struct packet *pkt). The first parameter is a pointer to the node that this vector belongs to. Typically, the node would be invoked via an inline that is provided a pointer to the next node as the parameter. This inline would fetch the jump vector via the node's VFT and then call it, using the node address as the parameter. The second parameter is the packet context.

new The new VFT entry is a constructor for this type of node. When called, it should allocate an instance of this type of node, initialize the node to sane values, install the VFT pointer etc. The address of the new node is returned, or NULL if some error occurred that prevented creation of the node.

config The config vector provides an abstracted configuration entry point for this particular node (see below for more details).

destroy The destructor for this node. Cleans up all resources attached to the node, and frees the node itself.

name Provides a terminating name string for the VFT.

Node Configuration

Each node within MSW contains configuration data passed down from the control plane. This configuration contains data specific to the feature such as data table references, interface or feature specific details (e.g. for an ACL node, which ACL should be applied to the packet), and node connection details (e.g. which node should the packet be passed onto).

In this embodiment, the interface to the node's configuration is via the VFT config entry, called: void config (struct plug *p, int argc, int argv[ ]). The first parameter indicates the node to be configured, and the configuration data is passed as an argc/argv pair, allowing variable length data to be passed to the node.

Figure 11:
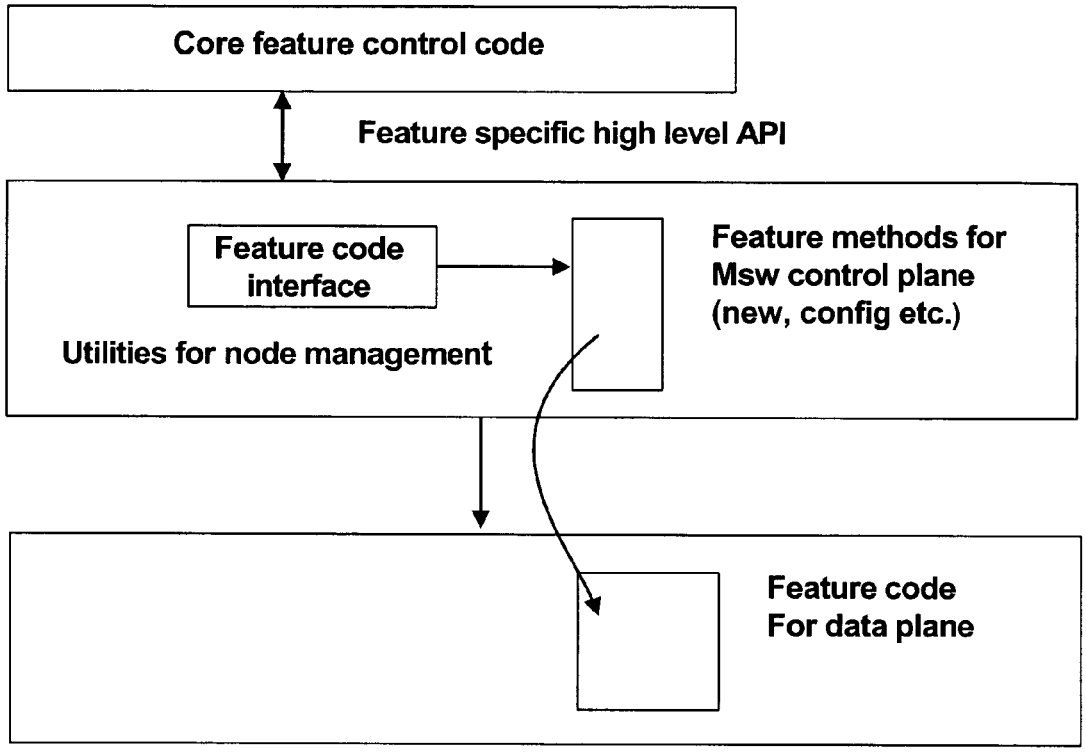
FIG. 11 is a block diagram depicting the layers for feature configuration.

As depicted in FIG. 11, typically, the feature's control plane side would invoke the configuration using a variable number of arguments (with perhaps the first argument being a particular configuration command); the control plane interface software would marshal the values into an array to be passed across to the node (in a distributed system, the arguments would be marshaled into an IPC packet, and then unpacked at the distributed node).

All resource references passed to the node configuration need to be non-system specific, i.e., no memory addresses can be passed across to MSW, because possibly the module resides in a separate address space. References such as to other nodes need to be done via the node ID.

Figure 12:
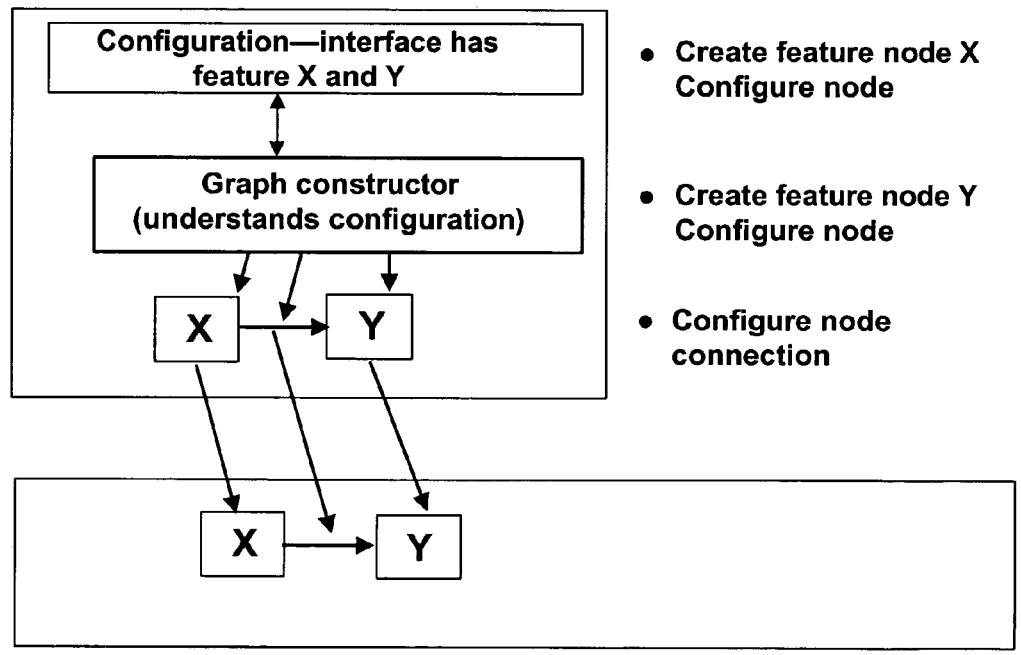
FIG. 12 is block diagram depicting the coupling of nodes in the data plane.

Referring now to FIG. 12, as an example, if a user configures an interface to include a feature X and Y then the following steps are implemented by a graph constructor 70 in the control plane. Feature nodes X and Y are configured as described above with proxy nodes formed in the control plane and corresponding switching nodes formed in the data planes. The graph constructor 72 then connects nodes X and Y so that both features are included in the switching path of the interface.

When the control plane connects the node into a graph, a configuration command is passed containing an appropriate command, as well as a node ID indicating the node it is to be connected to (i.e. the node being configured would have a pointer to the next node in the graph—the configuration command would map the node ID to the next node, and store this pointer as part of the node data).

Other MSW resources such as bulk data table references, interface tables etc., would also need abstracted reference IDs to avoid the use of pointers as configuration data. Existing systems use identification such as interface number etc.

Tracing and Debugging

One of the advantages of the flexible chain arrangement, described above, is that new nodes can be inserted invisibly into an existing chain. This can help greatly in debugging by selectively adding nodes that perform packet tracing or dumping. One problem being experienced in current switching code is that adding debugging or tracing can significantly impact performance because runtime checks are added regardless of whether tracing is required or not. With a MSW node chain, there is no inherent cost of debugging or tracing if it is not configured. Packet tracing nodes can be added at any stage of the chain (or at multiple points) without impacting the normal switching performance by simply inserting the appropriate debugging nodes. This would allow a greater granularity of packet tracing or debugging at any stage in the feature path without having to suffer the overhead if it wasn't enabled.

Routing Platform

Figure 13:
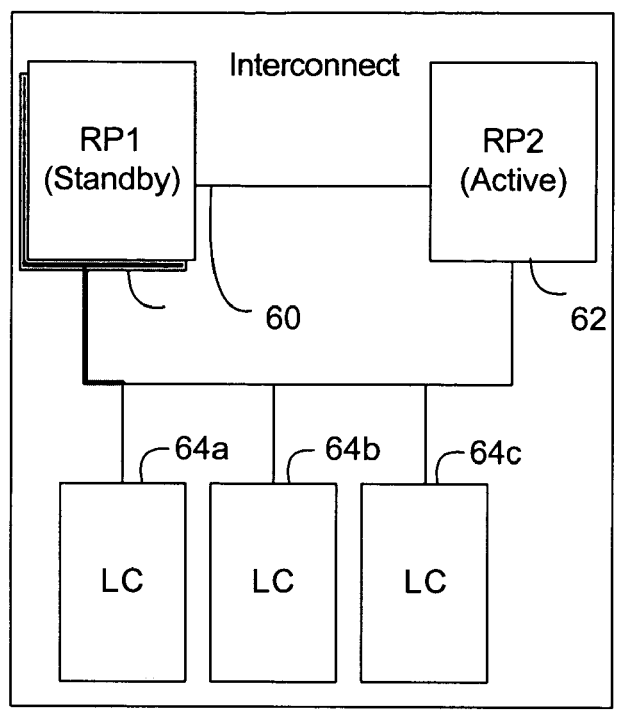
FIG. 13 is a block diagram of a routing platform.

FIG. 13 depicts a routing platform 59 on which the above described embodiments can be implemented. The routing platform includes two routing processors (Active and Standby) 60 and 62 coupled to a plurality of linecards 66 by a bus.

Modern routers are highly modular and include a chassis having multiple slots for inserting cards 66 to perform selected functions. Line cards connect the router to other devices via electrical or optical media. The switch fabric, in this embodiment, includes switch-fabric cards and scheduler cards.

The active route processor 62 maintains routing tables. In some routers switching is performed centrally by the route processor 62 and other routers implement distributed switching where switching is performed by the linecards 66 using tables updated by the route processor 62.

Figure 14:
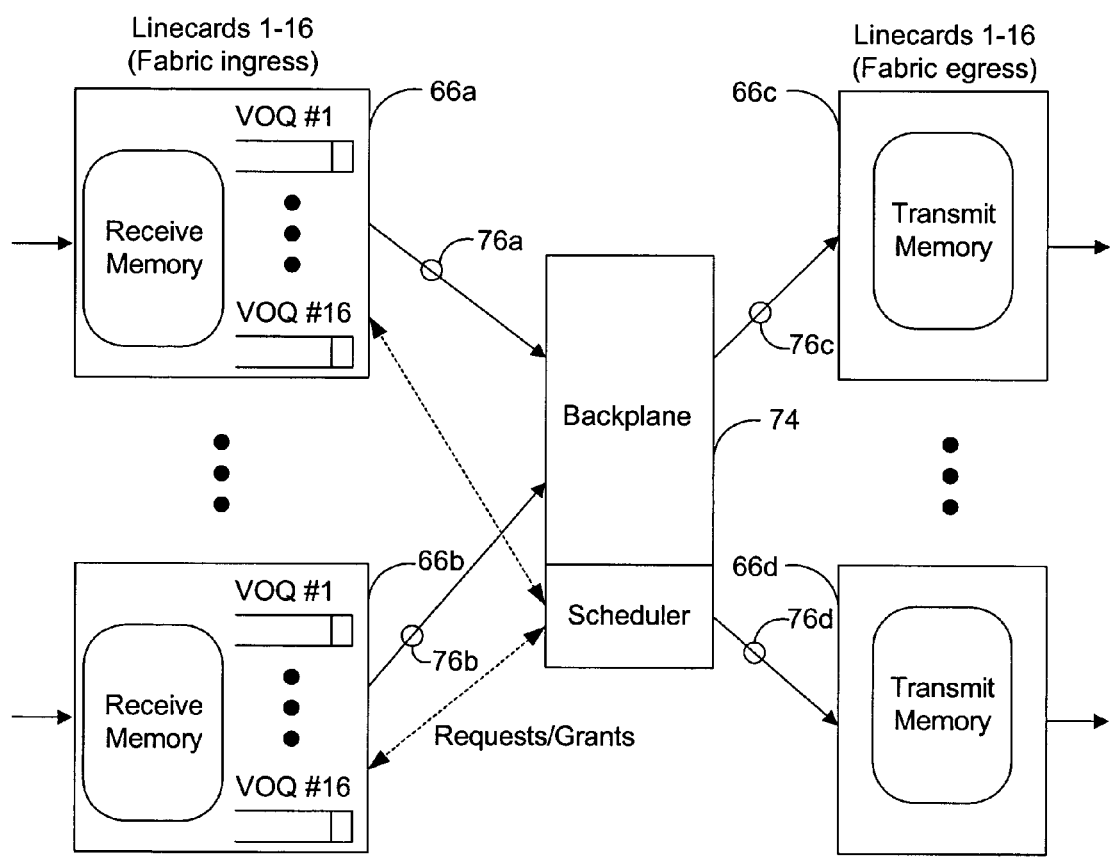
FIG. 14 is a block diagram depicting the linecards connected by a backplane.

FIG. 14 depicts the linecards 66 connected to a backplane 74 by serial links 76. In this embodiment, the crossbar includes crossbar switches in the form of ASICs coupled to a backplane formed of multiple serial links. Incoming packets are buffered on the egress linecard, the route of the packet is the determined, and the crossbar is utilized to transfer the packet to an output buffer on the egress linecard.

CONCLUSION

The invention may be implemented as program code, stored on a computer readable medium, that is executed by a digital processor. The computer readable medium may include, among other things, magnetic media, optical media, electro-magnetic fields encoding digital information, and so on.

The invention has now been described with reference to the preferred embodiments. Alternatives and substitutions will now be apparent to persons of ordinary skill in the art. For example, the features described are implemented in the IOS® operating system but the invention is generally applicable to features which are implemented in the switching path. Additionally, different techniques for marshalling arguments and passing arguments to remote instances can be utilized. Accordingly, it is not intended to limit the invention except as provided by the appended claims.

What is claimed is:

1. A system comprising:
   a data plane instance configured to utilize a plurality of interconnected feature nodes, forming a software-based graph, to switch and apply features to packets, with the each feature node in the graph containing private feature specific configuration data and feature specific code, and with multiplexing nodes in the software-based graph including pointers utilized to switch a packet to a selected one of multiple nodes connected to the multiplexing node depending on a packet context including a pointer to a location in memory where the packet is stored, packet size, and identity of the packet's input interface;
   a control plane management module configured to allocate ID values and bind a feature node in the data plane instance to an ID value that identifies the feature node in the data plane instance and with control plane management module configured to maintain a proxy node that represent the feature node in the data plane, with the proxy node including a pointer to the data plane instance and the ID; and
   a control plane interface configured to isolate details of actual communication between the control plane management module and the software-based graph.

2. The system of claim 1 where the graph further comprises:
   terminating nodes for either dropping, punting, or forwarding a packet.

3. The system of claim 2 where a feature node further comprises:
   a pointer to a virtual function table that contains methods for the feature node.

4. The system of claim 2 where the terminating node for forwarding a packet includes a platform interface and sinks the packet onto a router platform backplane.

5. The system of claim 1 where the software-based graph further comprises:
   input nodes for receiving a packet from an input interface.

6. The system of claim 5 where the input node includes a platform interface and sources the packet from a router platform backplane.

7. The system of claim 1 implemented on a routing platform having a plurality of linecards and using distributed processing, where:
   a data plane includes a plurality of data plane instances, with one data plane instance present on each linecard in the plurality, and with feature nodes in a data plane instance unable to access nodes in other data plane instances, and each feature node in a data plane instance identified by a node ID and the instance to which it belongs.

8. The system of claim 7 with the data plane instance further configured to:
   provide appropriate interfaces for nodes in the data plane instance.

9. The system of claim 8 with the data plane instance further configured to:
   utilize function calls for a local data plane instance in the same processor domain as the control plane management module; and
   utilize interprocess communication (IPC) methods for remote data plane instances on linecards.

10. The system of claim 1 with the control plane management module further configured to:
    pass configuration data to a feature node in the data plane instance.

11. The system of claim 1 where the proxy node further includes:
    flags describing attributes of the feature node and node graph pointers pointing to predecessors and successors of the feature node.

12. The system of claim 1 where the control plane management module is configured to:
    build proxy nodes corresponding to feature nodes in the data plane; and
    add, delete, configure, and connect proxy nodes and corresponding feature nodes.

13. A method comprising:
    creating a first feature node in a data plane to implement part of a first feature software-based graph that switches and applies features to packets;
    configuring the first feature node with private data, feature code, a pointer, and methods required to implement the first feature;
    creating a second feature node in the data plane to implement a second feature in the software-based graph;
    configuring the second node with local data, feature code, and methods required to implement the second feature with the pointer of the first feature node configured to point to the second feature node to connect the first and second feature nodes so that the first feature is implemented by the first feature node and the second feature is implemented by the second feature node;
    creating a first packet context for a first packet to be switched;
    inserting the first packet context into the first feature node;
    processing the first packet utilizing feature code and private data of the first feature node;
    jumping to a next feature node based on the first packet context; and
    processing the first packet utilizing feature code and private data of the next feature node
    creating a first proxy node at a control plane;
    configuring the first proxy node to contain a set of flags describing attributes of the first feature node and to contain node specific data;
    creating a second proxy node at a control plane; and
    configuring the second proxy node to contain a set of flags describing attributes of the second feature node and to contain node specific data.

14. The method of claim 13 where configuring the second proxy node includes the step of:
    including pointers in the first proxy node to all predecessor and successor nodes to the first feature node.

15. The method of claim 13 further comprising:
    creating a plurality of instances with a first instance including the first and second feature nodes;
    isolating feature nodes in each instance from feature nodes in other instances; and
    providing access methods in each instance that provide appropriate interfaces of nodes in the instance.

16. The method of claim 15, where if an instance is a remote instance, providing access methods includes:
    providing interprocess communication (IPC) methods.

17. A system comprising:
    means for creating a first feature node in a data plane to implement part of a first feature software-based graph that switches and applies features to packets;
    means for configuring the first feature node with private data, feature code, a pointer, and methods required to implement the first feature;

means for creating a second feature node in the data plane to implement a second feature in the software-based graph;

means for configuring the second node with local data, feature code, and methods required to implement the second feature, with the pointer of the first feature node configured to point to the second feature node to connect the first and second feature nodes so that the first feature is implemented by the first feature node and the second feature is implemented by the second feature node;

means for creating a first packet context for a first packet to be switched;

means for inserting the first packet context into the first feature node;

means for processing the first packet utilizing feature code and private data of the first feature node;

means for jumping to a next feature node based on the first packet context; and means for processing the first packet utilizing feature code and private data of the next feature node means for creating a first proxy node at a control plane;

means for configuring the first proxy node to contain a set of flags describing attributes of the first feature node and to contain node specific data;

means for creating a second proxy node at a control plane; and means for configuring the second proxy node to contain a set of flags describing attributes of the second feature node and to contain node specific data.

18. The method of claim 17 where the means for configuring the second proxy node includes:

means for including pointers in the first proxy node to all predecessor and successor feature nodes to the first feature node.

19. The system of claim 17 further comprising:

means for creating a plurality of instances with a first instance including the first and second feature nodes;

means for isolating feature nodes in each instance from feature nodes in other instances; and means for providing access methods in each instance that provide appropriate interfaces of nodes in the instance.

20. The system of claim 19 where if an instance is a remote instance, said means for providing access methods includes:

means for providing interprocess communication (IPC) methods.

* * * * *